United States Patent

Koizumi et al.

[11] Patent Number: 6,069,750
[45] Date of Patent: May 30, 2000

[54] WIDE-FIELD EYEPIECE

[75] Inventors: Noboru Koizumi, Omiya; Naomi Watanabe, Urawa, both of Japan

[73] Assignee: Fuji Photo Optical Co., Ltd., Omiya, Japan

[21] Appl. No.: 09/134,998

[22] Filed: Aug. 17, 1998

[30] Foreign Application Priority Data

Aug. 28, 1997 [JP] Japan .................................. 09-247701

[51] Int. Cl.$^7$ .............................. G02B 9/34; G02B 9/60; G02B 25/00
[52] U.S. Cl. .......................... 359/783; 359/770; 359/781; 359/644; 359/643
[58] Field of Search ..................... 359/643, 647, 359/770, 780, 783, 781

[56] References Cited

U.S. PATENT DOCUMENTS

| | | | |
|---|---|---|---|
| 4,747,675 | 5/1988 | Nagler | 350/410 |
| 5,659,422 | 8/1997 | Fukumoto | 359/644 |
| 5,774,270 | 6/1998 | Yanari | 359/644 |
| 5,812,324 | 9/1998 | Fukumoto | 359/643 |

FOREIGN PATENT DOCUMENTS 2-222914  9/1990  Japan .
6-175046  6/1994  Japan .

Primary Examiner—Scott J. Sugarman
Assistant Examiner—Suzanne Letendre
Attorney, Agent, or Firm—Arnold International; Bruce Y. Arnold

[57] ABSTRACT

A wide-field eyepiece, formed of at least four lens groups and five lens elements, is disclosed which satisfies predetermined conditional expressions, so as to provide an eyepiece having an angle of view of at least 65 degrees with less than 6% distortion. The wide-field eyepiece is formed of, in order from the side of an image position 1 formed by an objective lens (not illustrated): a first lens group $G_1$ of negative refractive power that includes a first lens element $L_1$ having a concave surface on both sides, a second lens group $G_2$ of positive refractive power that includes a second lens element $L_2$ having a convex surface on the side of an observer's eye position, a third lens group $G_3$ of positive refractive power wherein a lens element surface thereof has a convex surface on both sides and is cemented to a negative lens element having a concave surface on the side nearest the image 1 formed by the objective lens; and a fourth lens group $G_4$ of positive refractive power and including a lens element with different radii of curvature on its opposite sides, with the surface of larger radius of curvature lying on the side of an observer's eye position.

8 Claims, 5 Drawing Sheets

WIDE-FIELD EYEPIECE

BACKGROUND OF THE INVENTION

A wide-field eyepiece for telescopes and binoculars is disclosed, for example, in Japanese Laid Open Patent Application H02-222914 (1990), but this eyepiece includes at least six lens elements. A wide-field eyepiece is also disclosed in H06-093084 (1994), but this eyepiece includes at least six lens elements and has a field of view of only 54 degrees. Although a wide-field eyepiece consisting of only five lens elements is disclosed in Japanese Laid-Open Patent Application H06-175046 (1994), this eyepiece has a distortion of about 9%, whereas a distortion of greater than about 6% is apparent to an observer. Thus, there is a need for an eyepiece having fewer lens elements so as to be inexpensively manufactured, a wide field of view, and a distortion of 6% or less.

BRIEF SUMMARY OF THE INVENTION

The present invention is a wide-field eyepiece intended for use in telescopes and binoculars. It includes at least five lens elements in at least four lens groups which are structured and positioned to satisfy seven conditional expressions and provides a field of view of at least 65 degrees with less than 6% distortion.

A first object of the invention is to decrease the number of lens elements required in a wide-field eyepiece having acceptably low aberrations, thereby reducing the cost of the eyepiece. A second object of the invention is to provide an eyepiece having a field of view in excess of 55 degrees using only five lens elements. A third object of the invention is to provide an eyepiece that can be easily and inexpensively manufactured, has a field of view of 65 degrees, and has acceptably low aberrations, with less than 6% distortion.

BRIEF DESCRIPTION OF THE DRAWINGS

The present invention will become more fully understood from the detailed description given below and the accompanying drawings, which are given by way of illustration only and thus are not limitative of the present invention, and wherein.

DETAILED DESCRIPTION

Figure 1:
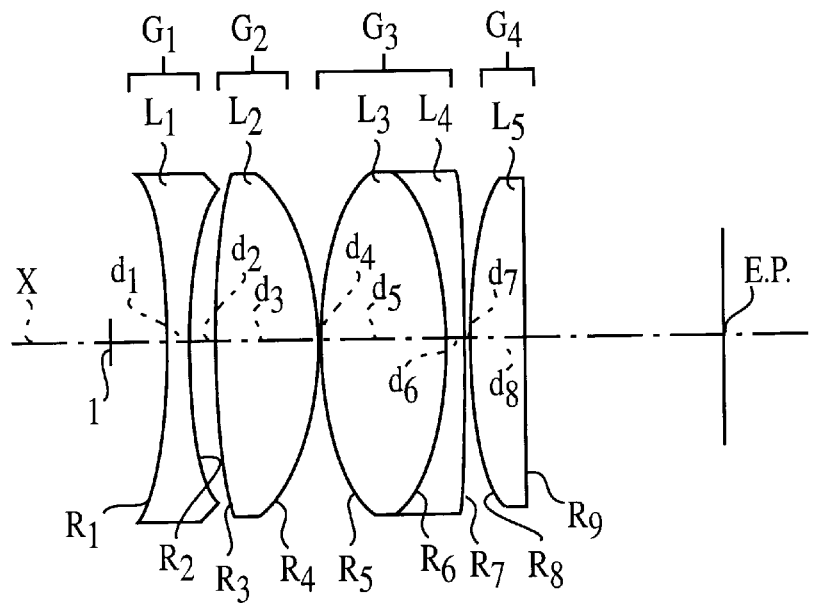
FIG. 1 is a schematic view showing a basic structure of lens elements according to a first embodiment of the invention.
Figure 2:
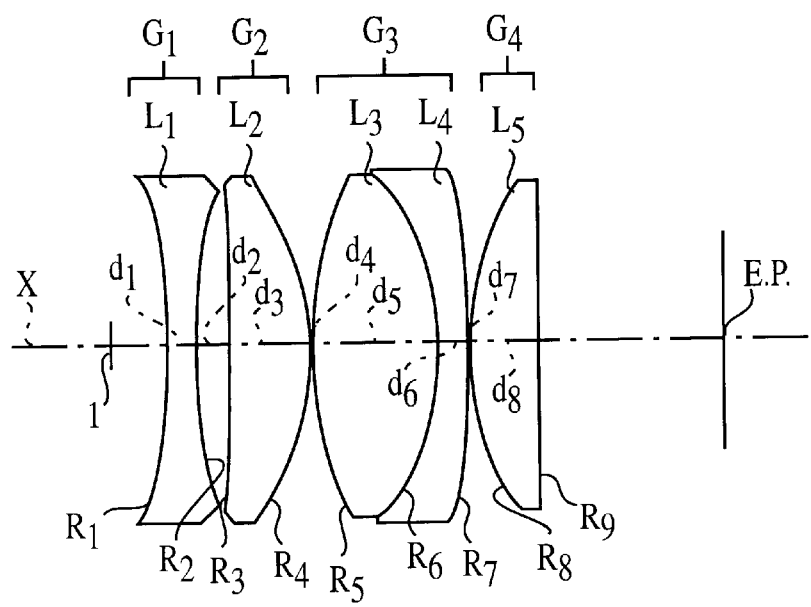
FIG. 2 is a schematic view showing a basic structure of lens elements according to a second embodiment of the invention.
Figure 3:
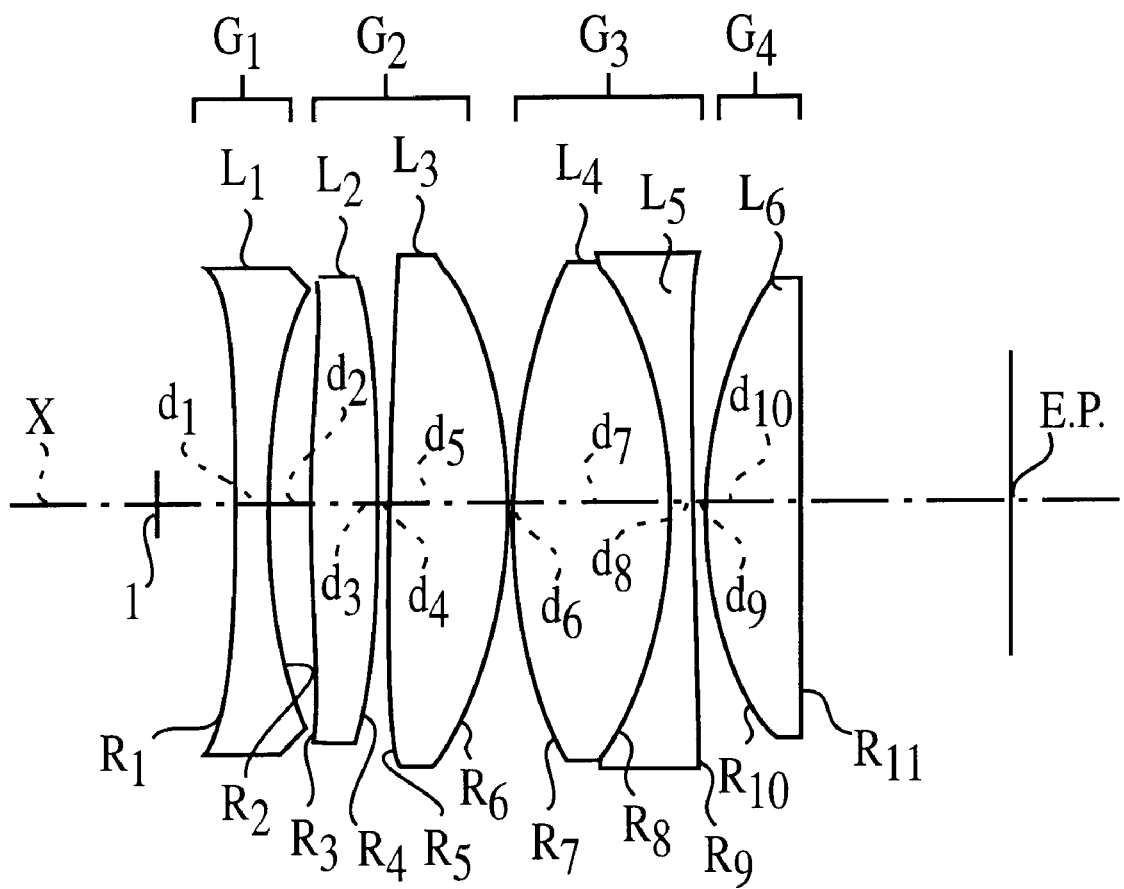
FIG. 3 is a schematic view showing a basic structure of lens elements according to a third embodiment of the invention.
Figure 4C:
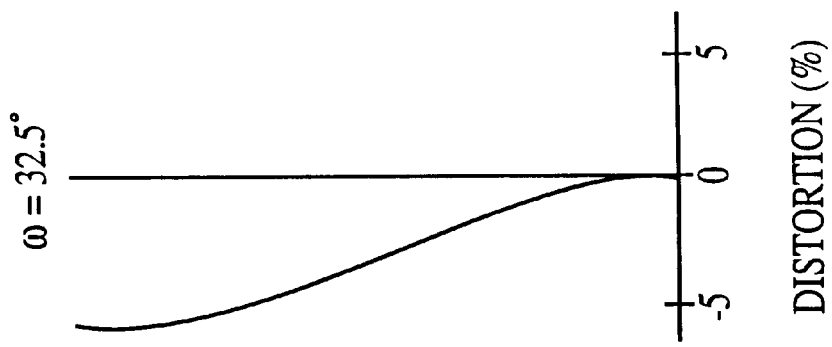
FIGS. 4A–4C show the spherical aberration, astigmatism and distortion respectively of the wide-field eyepiece according to the first embodiment of the invention.
Figure 4B:
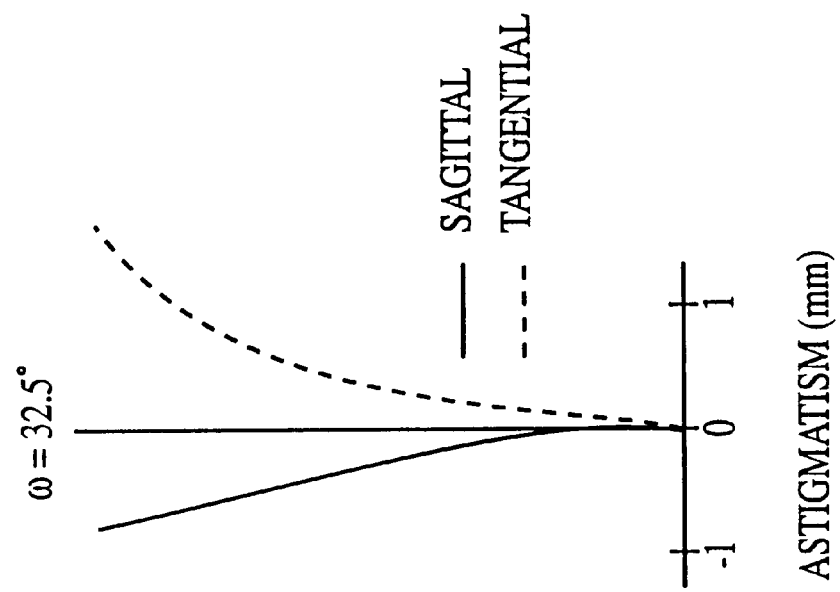
Figure 4A:
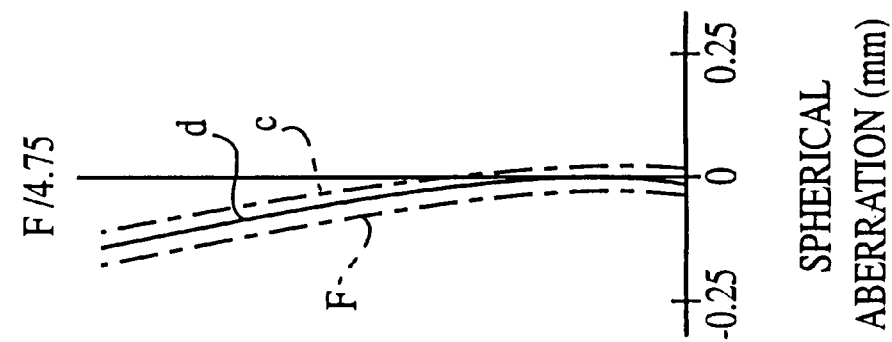
Figures 5A, 5B, 5C:
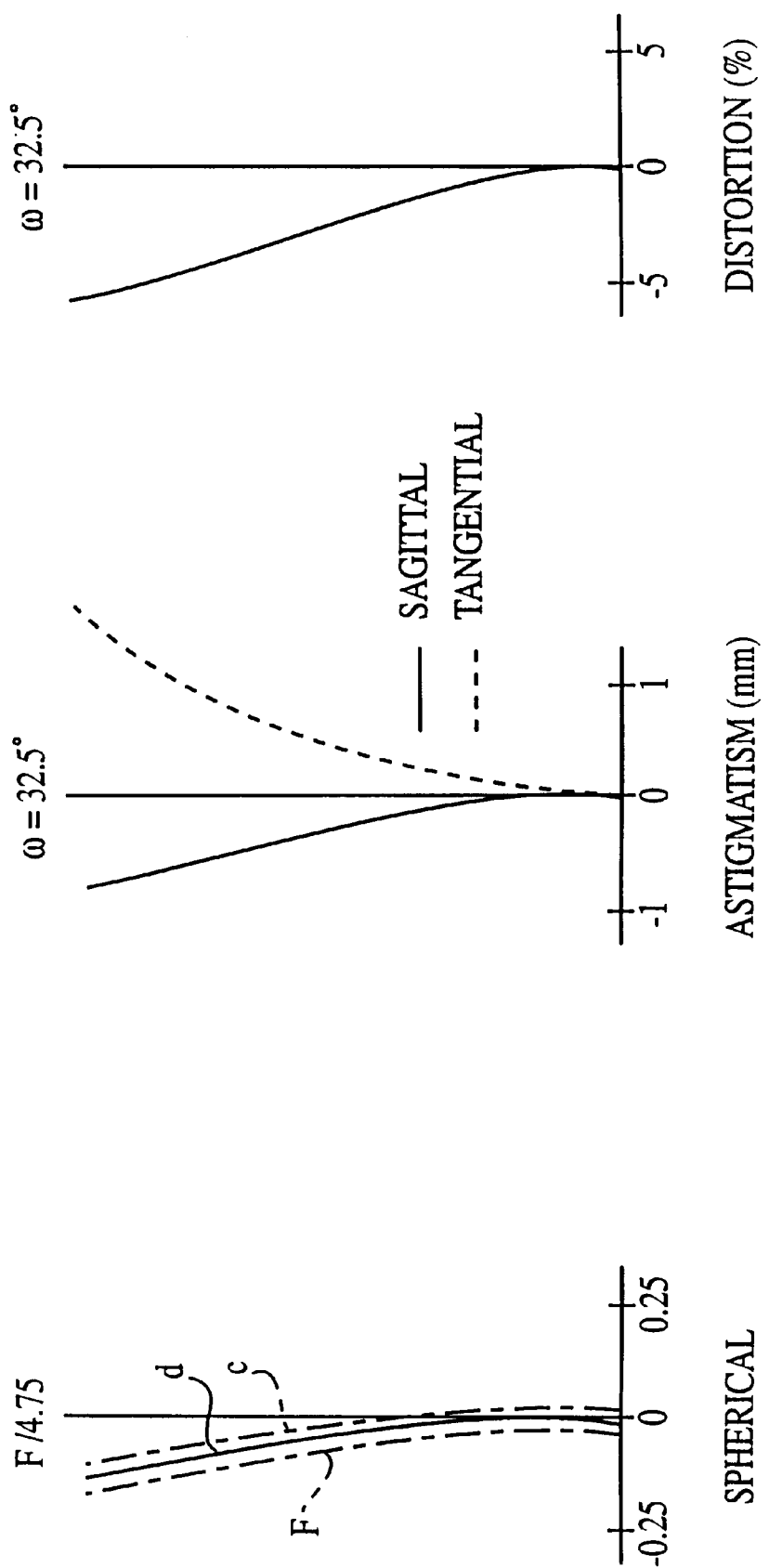
FIGS. 5A–5C show the spherical aberration, astigmatism and distortion respectively of the wide-field eyepiece according to the second embodiment of the invention.
Figure 6C:
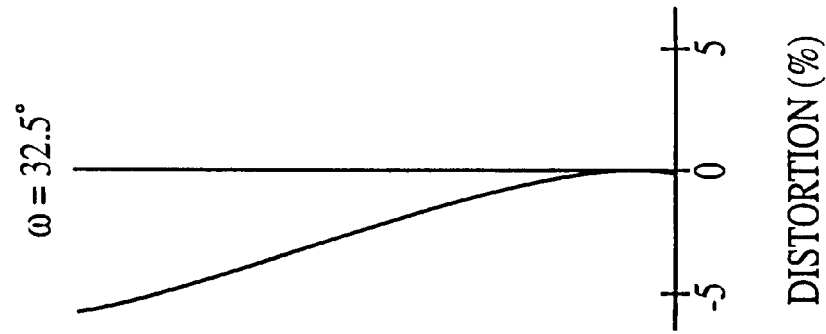
FIGS. 6A–6C show the spherical aberration, astigmatism and distortion respectively of the wide-field eyepiece according to the third embodiment of the invention.
Figure 6B:
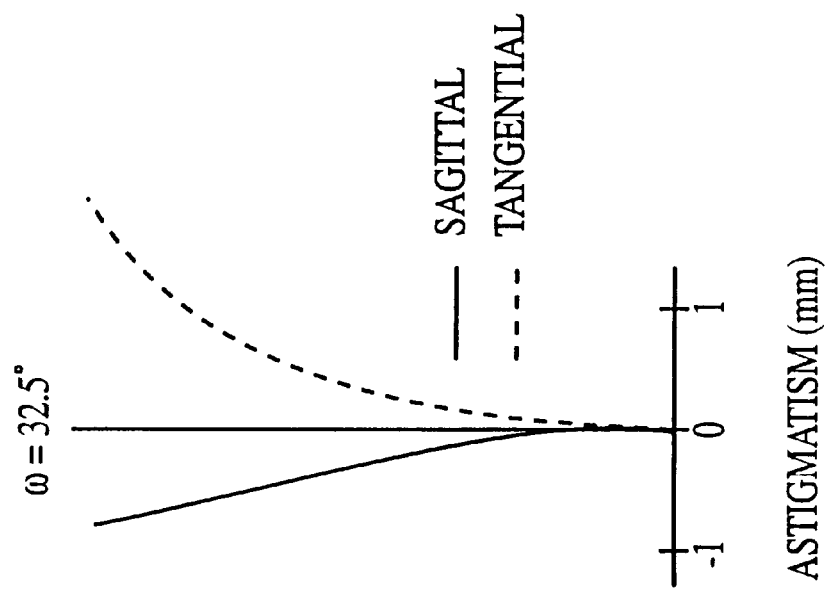
Figure 6A:
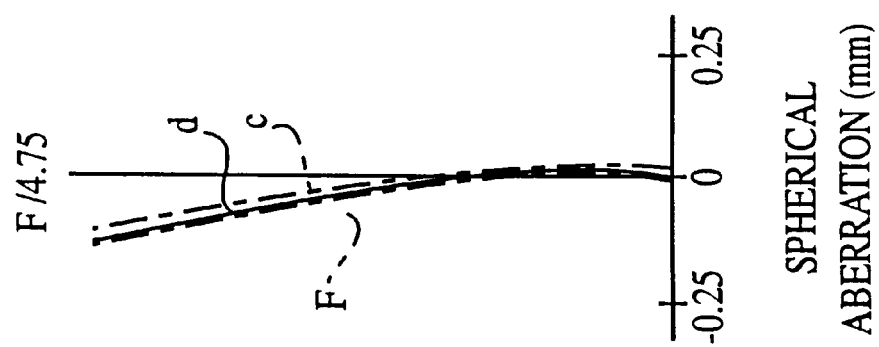

As shown in FIGS. 1–3, the present invention includes at least four lens groups, $G_1$–$G_4$ positioned along an optical axis x between an intermediate image position 1 formed by an objective lens (not illustrated) and an eye point position E.P. of an observer. Each of the embodiments 1–3 of the invention (illustrated in FIGS. 1–3, respectively) include, in order from the side of the image 1: a first lens group $G_1$ of negative refractive power, a second lens group $G_2$ of positive refractive power, a third lens group $G_3$ of positive refractive power, and a fourth lens group $G_4$ of positive refractive power. The wide-field eyepiece of the invention has at least five lens elements, configured and distributed among these lens groups as follows. The first lens group includes a bi-concave lens element $L_1$, the second lens group includes at least one positive lens element having a convex surface on the side of the observer, the third lens group includes a bi-convex lens element cemented to a concave surface of a negative lens element, and the fourth lens group includes a positive lens element having opposite surfaces of different radii of curvature, with its surface of larger radius of curvature on the side of the observer. Further, the wide-field eyepiece of the present invention satisfies the following conditional expressions (1)–(7):

$$1.3 < -f_1/f < 2.2 \tag{1}$$

$$2.0 < R_{1b}/f < 4.0 \tag{2}$$

$$1.3 < f_2/f < 2.2 \tag{3}$$

$$2.0 < f_3/f < 4.5 \tag{4}$$

$$1.8 < f_4/f < 3.2 \tag{5}$$

$$0.05 < N_{32} - N_{31} \tag{6},$$

and $$0.015 < 1/\upsilon_{32} - 1/\upsilon_{31} \tag{7}$$

where $f_1$ is the focal distance (in mm) of the first lens group $G_1$, f is the focal distance (in mm) of the wide-field eyepiece, $R_{1b}$ is the radius of curvature (in mm) on the eye side of the first lens group $G_1$, $f_2$ is the focal distance (in mm) of the second lens group $G_2$, $f_3$ is the focal distance (in mm) of the third lens group $G_3$, $f_4$ is the focal distance (in mm) of the fourth lens group $G_4$, $N_{32}$ is the index of refraction for the sodium d line of the negative lens element of the third lens group $G_3$, $N_{31}$ is the index of refraction for the sodium d line of the positive lens element of the third lens group $G_3$, $\upsilon_{32}$ is the Abbe number for the sodium d line of the negative lens element of the third lens group, and $\upsilon_{31}$ is the Abbe number for the sodium d line of the positive lens element of the third lens group.

In a telescope system including an objective lens and an eyepiece, the objective lens generally has a small angle of view, and distortion aberrations created by the objective lens are generally minimal. On the other hand, the eyepiece has overall positive power and, since the exit pupil is located at the back side of the eyepiece, the chief ray from the object received via the objective lens is generally sharply bent at the eyepiece in the direction of the optical axis. Thus, distortion in the final image as viewed by the observer results primarily from the eyepiece. However, by composing the first lens group of a single, biconcave lens element so that sharply refracted rays are incident on the surface nearest the object, negative distortion aberrations are generated, thus compensating for the positive distortion aberrations generated by the later components of the eyepiece. Since the first lens element has concave surfaces on both sides, the generation of other aberrations such as a coma is prevented.

The divergence of the chief ray becomes small above the upper limit of conditional expression (1), thus increasing the percentage distortion. The percentage distortion becomes small below the lower limit, but other aberrations increase. Also, the radius of curvature of a second surface of the first lens group becomes excessive above the upper limit of conditional expression (2), resulting in insufficient adjustment of coma at wide angles. Below the lower limit of conditional expression (2), the chief ray is sharply diverged at this surface, so that distortion would be reduced but other aberrations would be increased.

Moreover, if the chief ray diverged by the first lens group is refracted sharply toward the optical axis by strong positive power of a surface in the following lens group, positive distortion would increase. Therefore, refractive power should be distributed evenly among each of the lens groups $G_2$ through $G_4$ so as to gradually change the direction of the chief ray.

Under these considerations, distortion aberrations would increase below the lower limits of conditional expressions (3)–(5). Above the upper limits of conditional expressions (3)–(5), it becomes difficult to obtain a satisfactory focal distance.

Furthermore, objective lenses normally have a positive Petzval sum, and a meridional image surface and a sagittal image surface are curved on the side of the objective lens. In flattening the average image surface of the meridional image surface and sagittal image surface of eyepieces, the average image surface of the final image (when combined with the objective lens) remains curved. Thus, by providing a surface of the fourth lens group that has a smaller radius of curvature on the side of a viewed object, aberrations of an image formed with an objective lens and eyepiece can be decreased by having the field curvature of the average image surface of the eyepiece be made so as to compensate for the average field curvature due to the objective.

Moreover, conditional expression (6) provides a predetermined divergence by an inside surface. By satisfying conditional expression (6), the increase in image surface curvature and distortion aberrations is restrained.

Furthermore, conditional expression (7) ensures that the lens elements of the third lens group which are cemented together have sufficient difference in chromatic dispersion so as to correct for chromatic aberrations. Thus, when conditional expression (7) is satisfied, the lateral color and longitudinal chromatic aberration are sufficiently reduced so as to produce a good image.

The wide-field eyepieces of three specific embodiments of the present invention will now be explained in detail with reference to the figures.

Embodiment 1

FIG. 1 shows the basic lens element structure of a first embodiment of the invention. As illustrated in FIG. 1, the wide-field eyepiece of this embodiment (which may, for example, be located in an ocular section of a telescope or binocular) has five lens elements $L_1$–$L_5$. The first lens element $L_1$ has opposite surfaces of different radii of curvature, with the surface of smaller radius of curvature on the side of an observer's eye (located at E.P.). The second lens group $G_2$ is composed of a single, biconvex lens element $L_2$ having opposite sides of different radii of curvature, with the surface of larger curvature on the side of the observer, the third lens group $G_3$ is structured as mentioned previously, and the fourth lens group $G_4$ is composed of a fifth lens element $L_5$ having a convex surface on both sides, of different radii of curvature, with the surface of larger radius of curvature on the side of the observer.

Furthermore, the eyepiece is constituted so as to satisfy the above conditional expressions (1)–(7).

In the wide-field eyepiece constituted as described above, light formed into an image 1 by an objective lens (not shown) is guided through an eye point position (E.P.) of an observer by the lens groups $G_1$–$G_4$ where it is there observed by an eye of an observer.

Table 1 below shows, for embodiment 1 of the invention, the radius of curvature R (in mm) of each lens element surface, the on-axis surface spacing d (in mm) of each lens element surface, as well as the refractive index N and the Abbe number υ (each for the sodium d line).

TABLE 1

| f = 20 # | R | d | N | ν |
|---|---|---|---|---|
| 1 | −46.757 | 2.422 | 1.78471 | 25.7 |
| 2 | 40.200 | 2.222 | | |
| 3 | 86.374 | 9.962 | 1.69680 | 55.5 |
| 4 | −24.423 | 0.269 | | |
| 5 | 31.459 | 11.742 | 1.62040 | 60.3 |
| 6 | −30.044 | 2.422 | 1.78471 | 25.7 |
| 7 | −179.985 | 0.269 | | |
| 8 | 44.525 | 5.262 | 1.69680 | 55.5 |
| 9 | −214.599 | 18.504 (eye relief) | | |

Embodiment 2

FIG. 2 illustrates the structure of the lens elements and lens groups of the second embodiment. The lens element structure and spacings are similar to those in the first embodiment, except that the first lens element $L_1$ is made with less refractive power as a result of its larger radii of curvature on each surface and with the surface of larger radius of curvature on the side of the observer, and the second lens element $L_2$ is formed as positive meniscus lens having its convex surface on the side of the observer.

Table 2 below shows, for embodiment 2 of the invention, the radius of curvature R (in mm) of each lens element surface, the on-axis surface spacing d (in mm) of each lens element surface, as well as the refractive index N and the Abbe number υ (each for the sodium d line).

TABLE 2

| f = 20 # | R | d | N | ν |
|---|---|---|---|---|
| 1 | −57.176 | 2.422 | 1.78471 | 25.7 |
| 2 | 66.666 | 2.641 | | |
| 3 | −437.345 | 7.230 | 1.69680 | 55.5 |
| 4 | −26.503 | 0.269 | | |
| 5 | 38.681 | 11.573 | 1.62040 | 60.3 |
| 6 | −23.486 | 2.422 | 1.78471 | 25.7 |
| 7 | −77.773 | 0.269 | | |
| 8 | 30.662 | 6.044 | 1.69680 | 55.5 |
| 9 | −835.869 | 18.504 (eye relief) | | |

Embodiment 3

FIG. 3 illustrates the structure of the lens elements and lens groups of the third embodiment. The lens structure is similar to that of Embodiments 1 and 2, with the only differences being that the second lens element $L_2$ is using two lens elements $L_2$ and $L_3$ having a convex surface on both sides and the lens element $L_6$ nearest the observer is made with a meniscus shape.

Table 3 below shows, for embodiment 3 of the invention, the radius of curvature R (in mm) of each lens element surface, the on-axis surface spacing d (in mm) of each lens element surface, as well as the refractive index N and the Abbe number υ (each for the sodium d line).

TABLE 3 f = 20

| # | R | d | N | ν |
|---|---|---|---|---|
| 1 | −69.105 | 1.852 | 1.78471 | 25.7 |
| 2 | 43.213 | 2.475 | | |
| 3 | 184.962 | 4.514 | 1.69699 | 48.5 |
| 4 | −87.747 | 0.463 | | |
| 5 | 301.366 | 7.661 | 1.71300 | 53.9 |
| 6 | −32.184 | 0.463 | | |
| 7 | 41.956 | 9.791 | 1.71300 | 53.9 |
| 8 | −31.497 | 1.852 | 1.78471 | 25.7 |
| 9 | 227.736 | 0.463 | | |
| 10 | 26.912 | 6.057 | 1.62298 | 58.1 |
| 11 | 543.300 | 17.757 (eye relief) | | |

Table 4 lists, for each embodiment discussed above, the values of $-f_1/f$, $R_{1b}/f$, $f_2/f$, $f_3/f$, $f_4/f$, $N_{32}-N_{31}$, $1/υ_{32}-1/υ_{31}$, distortion %, and angle of view.

TABLE 4

| | Embodiment 1 | Embodiment 2 | Embodiment 3 |
|---|---|---|---|
| $-f_1/f$ | 1.36 | 1.94 | 1.68 |
| $R_{1b}/f$ | 2.01 | 3.33 | 2.16 |
| $f_2/f$ | 1.42 | 2.01 | 1.45 |
| $f_3/f$ | 2.68 | 2.68 | 4.21 |
| $f_4/f$ | 2.66 | 2.13 | 2.27 |
| $N_{32}-N_{31}$ | 0.165 | 0.165 | 0.072 |
| $1/ν_{32}-1/ν_{31}$ | 0.022 | 0.022 | 0.020 |
| distortion | 5.6% | 5.6% | 5.6% |
| angle of view (in degrees) | 65. | 65. | 65. |

Thus, the above conditional expressions (1)–(7) are all satisfied for each of embodiments 1–3, with there being less than 6% distortion and an angle of view of at least 65 degrees.

In FIGS. 4A–4C, 5A–5C, 6A–6C are illustrated the spherical aberration (for the sodium c, d , and F lines), the astigmatism (in the sagittal and tangential planes), and the percentage distortion respectively for each of embodiments 1–3, respectively. As is clearly shown in these figures, the aberrations become acceptably low in each embodiment mentioned above, achieving good performance for a wide field of view (2ω) of 65 degrees.

As described above, the wide-field eyepiece of the present invention has four lens groups, a field of view of greater than 55 degrees, five or six lens elements, and acceptably low aberrations with less than 6% distortion. The invention being thus described, it will be obvious that the same may be varied in many ways. For example, the radius of curvature R or the surface spacing d may be readily altered. Such variations are not to be regarded as a departure from the spirit and scope of the invention. Thus, all such modifications as would be obvious to one skilled in the art are intended to be included within the scope of the following claims. Moreover, the scope of the present invention is not intended to be limited to that given in the above specific examples. Rather, the scope is intended to be defined by the following claims and their legal equivalents.

What is claimed is:

1. A wide-field eyepiece comprising, in order from the side of a viewed object:

a first lens group of negative refractive power, which consists of a single, biconcave lens element;

a second lens group of positive refractive power, a third lens group of positive refractive power which includes a lens element of positive refractive power and a lens element of negative refractive power that are cemented together; and, a fourth lens group of positive refractive power which includes a lens element of positive refractive power having opposite surfaces of different radii of curvature, with the surface of larger radius of curvature lying on the side of an observer's eye position, wherein an air space separates each said lens group from an adjacent lens group, and said wide-field eyepiece has a field of view greater than 55 degrees.

2. The wide-field eyepiece as set forth in claim 1, wherein the following conditional expression is satisfied:

$$1.3 < -f_1/f < 2.2$$

where $f_1$ is the focal distance in mm of the first lens group, and f is the focal distance in mm of the wide-field eyepiece.

3. The wide-field eyepiece as set forth in claim 2, and wherein the following conditional expressions are also satisfied:

$$2.0 < R_{1b}/f < 4.0;$$

$$1.3 < f_2/f < 2.2;$$

$$2.0 < f_3/f < 4.5;$$

$$1.8 < f_4/f < 3.2;$$

$$0.05 < N_{32} - N_{31};$$

and $$0.015 < 1/υ_{32} - 1/υ_{31}$$

where $R_{1b}$ is the radius of curvature in mm on the eye side of the first lens group, $f_2$ is the focal distance in mm of the second lens group, $f_3$ is the focal distance in mm of the third lens group, $f_4$ is the focal distance in mm of the fourth lens group, $N_{32}$ is the index of refraction for the sodium d line of the negative lens of the third lens group, $N_{31}$ is the index of refraction for the sodium d line of the positive lens of the third lens group, $υ_{31}$ is the Abbe number for the sodium d line of the positive lens element of the third lens group, and $υ_{32}$ is the Abbe number for the sodium d line of the negative lens element of the third lens group.

4. The wide-field eyepiece according to claim 1, wherein the following construction parameters are satisfied:

| # | R | d | N | ν |
|---|---|---|---|---|
| 1 | −46.757 | 2.422 | 1.78471 | 25.7 |
| 2 | 40.200 | 2.222 | | |
| 3 | 86.374 | 9.962 | 1.69680 | 55.5 |

-continued

| # | R | d | N | ν |
|---|---|---|---|---|
| 4 | −24.423 | 0.269 | | |
| 5 | 31.459 | 11.742 | 1.62040 | 60.3 |
| 6 | −30.044 | 2.422 | 1.78471 | 25.7 |
| 7 | −179.985 | 0.269 | | |
| 8 | 44.525 | 5.262 | 1.69680 | 55.5 |
| 9 | −214.599 | 18.504 (eye relief) | | | where # is the surface number of the wide-field eyepiece, in order from the side of a viewed object, R is the radius of curvature in mm, d is the on-axis surface spacing in mm, N is the index of refraction for the sodium d line, and υ is the Abbe number for the sodium d line.

5. The wide-field eyepiece according to claim 1, wherein the following construction parameters are satisfied:

| # | R | d | N | ν |
|---|---|---|---|---|
| 1 | −57.176 | 2.422 | 1.78471 | 25.7 |
| 2 | 66.666 | 2.641 | | |
| 3 | −437.345 | 7.230 | 1.69680 | 55.5 |
| 4 | −26.503 | 0.269 | | |
| 5 | 38.681 | 11.573 | 1.62040 | 60.3 |
| 6 | −23.486 | 2.422 | 1.78471 | 25.7 |
| 7 | −77.773 | 0.269 | | |
| 8 | 30.662 | 6.044 | 1.69680 | 55.5 |
| 9 | −835.869 | 18.504 (eye relief) | | | where # is the surface number of the wide-field eyepiece, in order from the side of a viewed object, R is the radius of curvature in mm, d is the on-axis surface spacing in mm, N is the index of refraction for the sodium d line, and υ is the Abbe number for the sodium d line.

6. The wide-field eyepiece according to claim 1, wherein the following construction parameters are satisfied:

| # | R | d | N | ν |
|---|---|---|---|---|
| 1 | −69.105 | 1.852 | 1.78471 | 25.7 |
| 2 | 43.213 | 2.475 | | |
| 3 | 184.962 | 4.514 | 1.69699 | 48.5 |
| 4 | −87.747 | 0.463 | | |
| 5 | 301.366 | 7.661 | 1.71300 | 53.9 |
| 6 | −32.184 | 0.463 | | |
| 7 | 41.956 | 9.791 | 1.71300 | 53.9 |
| 8 | −31.497 | 1.852 | 1.78471 | 25.7 |
| 9 | 227.736 | 0.463 | | |
| 10 | 26.912 | 6.057 | 1.62298 | 58.1 |
| 11 | 543.300 | 17.757 (eye relief) | | | where # is the surface number of the wide-field eyepiece from the side of a viewed object, R is the radius of curvature in mm, d is the on-axis surface spacing in mm, N is the index of refraction for the sodium d line, and υ is the Abbe number for the sodium d line.

7. A wide-field eyepiece having at least four lens groups, an angle of view of at least 65 degrees, and a maximum distortion of less than 6%.

8. The wide-field eyepiece according to claim 7, said eyepiece consisting of only five lens elements.

* * * * *